(12) United States Patent
Shimamura et al.

(10) Patent No.: US 8,965,948 B2
(45) Date of Patent: Feb. 24, 2015

(54) SERVER APPARATUS AND CLIENT APPARATUS IN PRESENCE DISPLAY SYSTEM

(75) Inventors: Koichi Shimamura, Minato-ku (JP); Takenori Sekiya, Minato-ku (JP); Satoshi Nishizawa, Minato-ku (JP); Hideaki Suga, Minato-ku (JP); Jota Nakatsuma, Minato-ku (JP); Hisashi Kato, Minato-ku (JP); Yoshimi Saito, Minato-ku (JP)

(73) Assignee: Vodafone Group PLC, Newbury, Berkshire (GB)

( * ) Notice: Subject to any disclaimer, the term of this patent is extended or adjusted under 35 U.S.C. 154(b) by 986 days.

(21) Appl. No.: 10/576,048

(22) PCT Filed: Oct. 14, 2004

(86) PCT No.: PCT/JP2004/015138
§ 371 (c)(1),
(2), (4) Date: Aug. 7, 2006

(87) PCT Pub. No.: WO2005/039221
PCT Pub. Date: Apr. 28, 2005

(65) Prior Publication Data
US 2007/0078965 A1    Apr. 5, 2007

(30) Foreign Application Priority Data
Oct. 17, 2003 (JP) .................................. 2003-357885

(51) Int. Cl.
*G06F 15/16* (2006.01)
*H04M 3/42* (2006.01)
(Continued)

(52) U.S. Cl.
CPC ....... *H04M 3/42374* (2013.01); *H04L 12/5815* (2013.01); *H04L 51/043* (2013.01);
(Continued)

(58) Field of Classification Search
USPC .......................................................... 709/206
See application file for complete search history.

(56) References Cited

U.S. PATENT DOCUMENTS 6,658,095 B1 * 12/2003 Yoakum et al. ............ 379/93.01
6,968,179 B1 * 11/2005 De Vries .................... 455/414.1
(Continued)

FOREIGN PATENT DOCUMENTS

EP           1176840 A       1/2002
JP           2002-354522     12/2002
(Continued)

*Primary Examiner* — Michael Y Won
(74) *Attorney, Agent, or Firm* — Muirhead and Saturnelli, LLC

(57) ABSTRACT

The presence display system of the present invention displays presences and distances between buddies.
The mobile station 11 performs poling to the user data section 26 at predetermined time intervals, transmits location information of the mobile station 11 to the presence server 27, receives buddies state information and information indicating the proximity between the user and the buddies, and displays the presence of the buddies by means of an icon with a size that corresponds with the proximity. The buddy list server 28 calculates the distance between the user and the buddies from the location information of the mobile station 11 and the location information of the requested buddies in accordance with the poling by the mobile station 11, determines the proximity by comparing the distance with a threshold value that is set by the user, and transmits the proximity to the mobile station 11.

49 Claims, 12 Drawing Sheets

(51) Int. Cl.
*H04L 12/58* (2006.01)
*H04M 1/725* (2006.01)
*H04W 4/02* (2009.01)

(52) U.S. Cl.
CPC ...... *H04M1/72572* (2013.01); *H04M 3/42357* (2013.01); *H04W 4/02* (2013.01); *H04L 12/588* (2013.01); *H04L 51/32* (2013.01); *H04M 1/72547* (2013.01); *H04M 3/42093* (2013.01); *H04M 3/42365* (2013.01); *H04M 2201/38* (2013.01)
USPC ........... 709/203; 709/219; 709/223; 709/228; 709/229; 709/248

(56) References Cited

U.S. PATENT DOCUMENTS

| | | | |
|---|---|---|---|
| 7,386,798 B1 * | 6/2008 | Heikes et al. | 715/752 |
| 7,610,343 B2 * | 10/2009 | Ikezawa et al. | 709/206 |
| 7,668,537 B2 * | 2/2010 | De Vries | 455/414.1 |
| 7,765,484 B2 * | 7/2010 | Roskind | 715/752 |
| 7,945,035 B2 * | 5/2011 | Michael et al. | 379/201.1 |
| 7,969,993 B2 * | 6/2011 | Shimamura et al. | 370/401 |
| 8,200,755 B2 * | 6/2012 | Fujimoto et al. | 709/204 |
| 8,316,117 B2 * | 11/2012 | Nguyen et al. | 709/222 |
| 8,340,691 B1 * | 12/2012 | Starenky et al. | 455/456.3 |
| 8,356,038 B2 * | 1/2013 | Torrens et al. | 707/749 |
| 8,385,964 B2 * | 2/2013 | Haney | 455/519 |
| 8,386,769 B2 * | 2/2013 | Bells et al. | 713/153 |
| 8,458,321 B2 * | 6/2013 | Agulnik et al. | 709/224 |
| 8,472,929 B2 * | 6/2013 | Cotevino et al. | 455/414.2 |
| 8,474,628 B1 * | 7/2013 | Appelman et al. | 209/206 |
| 8,483,670 B2 * | 7/2013 | De Vries | 455/414.1 |
| 8,515,870 B2 * | 8/2013 | Oskolkov et al. | 705/43 |
| 8,527,600 B2 * | 9/2013 | Kakuta et al. | 709/207 |
| 8,538,458 B2 * | 9/2013 | Haney | 455/456.2 |
| 8,572,080 B2 * | 10/2013 | Tobin et al. | 707/736 |
| 8,613,002 B2 * | 12/2013 | Narayanan et al. | 719/328 |
| 8,682,302 B2 * | 3/2014 | De Vries | 455/414.1 |
| 8,719,426 B1 * | 5/2014 | Mishra et al. | 709/227 |
| 8,769,003 B2 * | 7/2014 | Aggarwal et al. | 709/203 |
| 2004/0162882 A1 * | 8/2004 | Mora | 709/207 |
| 2004/0170263 A1 * | 9/2004 | Michael et al. | 379/201.1 |
| 2004/0267887 A1 * | 12/2004 | Berger et al. | 709/206 |
| 2005/0227676 A1 * | 10/2005 | De Vries | 455/414.1 |
| 2007/0288852 A1 * | 12/2007 | Fish | 715/753 |
| 2010/0151842 A1 * | 6/2010 | De Vries | 455/414.1 |
| 2010/0227594 A1 * | 9/2010 | De Vries | 455/414.1 |
| 2013/0095859 A1 * | 4/2013 | De Vries | 455/456.3 |
| 2013/0198652 A1 * | 8/2013 | Dunn et al. | 715/751 |
| 2013/0238706 A1 * | 9/2013 | Desai | 709/204 |

FOREIGN PATENT DOCUMENTS

| | | |
|---|---|---|
| JP | 2003-116169 | 4/2003 |
| JP | 2003-153322 | 5/2003 |
| WO | WO 00/22860 | 4/2000 |
| WO | WO 01/84867 | 11/2001 |
| WO | WO 03/065701 A | 8/2003 |

\* cited by examiner

FIG. 2B
ABSOLUTE PRESENCE

| | |
|---|---|
| ABSOLUTE PRESENCE ID: | 1 |
| ABSOLUTE PRESENCE NAME: | IN MEETING |
| TRANSFER DESTINATION TELEPHONE NUMBER: | 0311112222 |
| NO RESPONSE/NO CONDITION FLAG: | NO RESPONSE |
| ANSWERING MACHINE FLAG: | On |
| CHAT PERMISSION: | NOT PERMITTED |
| RELATIVE PRESENCE SETTING TO CSet 0: | 1 |
| RELATIVE PRESENCE SETTING TO CSet 1: | 0 |
| RELATIVE PRESENCE SETTING TO CSet 2: | 0 |
| RELATIVE PRESENCE SETTING TO CSet 3: | 0 |

FIG. 2C
RELATIVE PRESENCE

| ID | NAME | PICTOGRAPH CODE | COMMENT |
|---|---|---|---|
| 0 | ARRIVED AT WORK | E056 | |
| 1 | IN MEETING | E059 | BORED |
| 2 | JOINT PARTY | E057 | JOINT PARTY ♪ |
| 3 | PRIVATE BUSINESS | E05A | MISSING |
| ... | ... | ... | ... |

FIG. 2A
PRESENCE INFORMATION

| | |
|---|---|
| SUBSCRIBER ID: | 00000123 |
| UID: | 110StyAAAAAAAA1 |
| MSN: | 09012345678 |
| PASSWORD: | hogehoge |
| PIN: | 1234 |
| EMAIL ADDRESS: | hoge@jp-t.ne.jp |
| REAL NAME: | JIEI FUON |
| NICKNAME: | J-PHONE |
| SELECTED COMMUNITY SET: | 1 |
| STANDBY POLING RECEPTION: | OK |
| STANDBY POLING INTERVAL: | 300 |
| PRESENCE UPDATE TIME: | 20030514 11:10:05 |
| LATITUDE: | 35:39:34 |
| LONGITUDE: | 139:45:06 |
| ADDRESS INFORMATION: | ATAGO, MINATO-KU, TOKYO |
| CLOSE RANGE THRESHOLD VALUE: | 1 km |
| LONG RANGE THRESHOLD VALUE: | 3 km |
| ABSOLUTE PRESENCE SETTING: | 1 |
| TEMPORARY COMMENT: | |
| ... | |

COMMUNITY SET ID: 0

COMMUNITY SET NAME: COMPANY

| BUDDY ID | DISPLAY ORDER | BUDDY NAME | PROXIMITY | LOCATION PERMISSION | CONSENT | SUBSCRIPTION |
|---|---|---|---|---|---|---|
| 00000456 | 2 | MR. B | CLOSE | FULL | OK | OK |
| 00087654 | 4 | C | MIDRANGE | ONLY PROXIMITY | OK | OK |
| 00000033 | 3 | MS. D | N/A | N/A | NG | OK |
| 90000005 | 1 | SECTION CHIEF E | N/A | N/A | N/A | NG |

COMMUNITY SET

FIG. 3A

| NON-SUBSCRIBER ID | BUDDY NAME | MSN | EMAIL ADDRESS |
|---|---|---|---|
| 90000002 | MR. H | 05022222222 | e@foomail.com |
| 90000003 | MISS F | 03333333333 | N/A |
| 90000004 | MR. G | 09044444444 | g@jp-t.ne.jp |
| 90000005 | SECTION CHIEF E | 04555555555 | e@foo.co.jp |

NON-SUBSCRIBER LIST

FIG. 3B

SERVER APPARATUS AND CLIENT APPARATUS IN PRESENCE DISPLAY SYSTEM

This application is the U.S. National Phase under 35 U.S.C. §371 of International Application PCT/JP 2004/015138, filed on Oct. 14, 2004, which claims priority to Japanese Patent Application No. 2003-357885, filed on Oct. 17, 2003, the contents of which are all herein incorporated by this reference in their entireties. The International Application was published under PCT Article 21(2) in a language other than English. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to a presence display system capable of displaying the states of other users.

BACKGROUND ART

In recent years, instant messaging (IM) has attracted attention as communication means on IP networks such as the Internet. IM is a service that combines presence services to permit referencing of the states (presences) of partners such as whether partners are connected to the network and message exchange services that perform character-based conversations in real-time such as chats and progress has been made in standardizing such services (See RFC2778 and RFC2779).

Further, the application of such IM services to mobile phones has also been proposed and Wireless Village, the Mobile Instant Messaging and Presence Services (IMPS) Initiative), which is standards body for IM service-related technology using mobile phones has been established, and common specifications that are also used for the exchange of presence information and messages between Internet-based services instead of between mobile devices have been decided on.

DISCLOSURE OF THE INVENTION

Problem that the Invention is Intended to Solve

Thus, presence services are also provided by communication systems that comprise mobile phones.

Therefore, an object of the present invention is to provide a presence display system that is easier to use that makes use of the characteristics of mobile phones.

Means for Solving the Problem

In order to achieve the above object, the server apparatus in the presence display system of the present invention is a server apparatus in a presence display system comprising the server apparatus and a client apparatus for each user, constituted to allow the client apparatus to display the states of other users, comprising: means for holding information indicating the states of each user and location information that are transmitted by each of the client apparatuses; means for storing a buddy list that registers other users whose states the user wishes to watch, for each user; and means for transmitting, to each user, information indicating the states of other users registered in the buddy list and information relating to the distance between the user and the other users.

Further, the location information includes latitude and longitude information, and the server apparatus in a presence display system further comprises means for calculating the distance between the user and the other users registered in the buddy list on the basis of the latitude and longitude information transmitted by each user, and determining the proximity of the other users by comparing the calculated distance with a predetermined threshold value, wherein the proximity thus determined is transmitted to the client apparatus as information relating to the distance between the user and the other users.

In addition, the threshold value can be optionally set by each user.

Further, the location information also includes address information, and address information is transmitted to the client apparatus in addition to the proximity.

Furthermore, means for storing information indicating whether a user gives consent for information relating to distance thereof to be transmitted to the other users is provided for each user and the information relating to the distance is not transmitted to the client apparatus of users that have not consented to the transmission of information relating to distance.

Moreover, means for storing information indicating whether a user gives consent for address information thereon to be transmitted to other users is provided for each user and the address information is not transmitted to the client apparatus of users that have not consented to the transmission of address information.

In addition, the buddy list is constituted by a plurality of community sets in which other users whose state the user wishes to watch are registered in groups; and information indicating the states of the other users registered in a community set designated by the user and information relating to the distances between the user and the other users are transmitted to the client apparatus.

Further, a relative presence setting table that associates and stores information indicating the state of the user and information indicating states transmitted to the other user in accordance with the community sets to which the other users that have registered the user in a buddy list belong is provided for each user; and when information indicating the states of each user is transmitted to other users that are watching the state of the user, information indicating states corresponding with the community sets of the other users is transmitted by referencing the relative presence setting table.

Furthermore, the server apparatus in a presence display system further comprises: means for creating a list of other users that are watching the state of the user and transmitting the list to the user in accordance with a request from the user.

Further, the client apparatus in a presence display system of the present invention is a client apparatus in a presence display system comprising a server apparatus and a client apparatus for each user, constituted to allow the client apparatus to display the states of other users, comprising: means for transmitting information indicating the state of the user and location information to the server apparatus; means for receiving information indicating the states of other users and information relating to the distance between the user and the other users from the server apparatus; and means for displaying the states of the other users in a display form that corresponds with the distance between the other users and the user on the basis of the information indicating the states of the other users and information relating to the distance between the user and the other users thus received.

Moreover, the information relating to the distance between the user and the other users is the proximity that is determined by comparing the distance between the user and the other users with a predetermined threshold value; and the displaying means displays an image corresponding with the information indicating the states of the other users received from the server apparatus with a size that corresponds with the proximity.

In addition, the information relating to the distance between the user and the other users further includes address information and the displaying means is capable of displaying the addresses of the other users.

Effect of the Invention

The server apparatus and client apparatus in a presence display system of the present invention allows the presences of buddies to be displayed in a display state corresponding with the distance between the buddies.

Further, the distance between the buddies is represented by proximity that indicates which stage among a plurality of stages the buddies are in and, because distance is represented relatively, a distance display that takes privacy into account can be executed.

In addition, because the user is able to set a threshold value for the distance, proximity that conforms to the senses of the user can be established.

Address information can also be reported in addition to proximity.

Further, the user is able to deny notification of their own location information, address information, and so forth by a partner.

Because a relative presence that is established beforehand in accordance with a community set that other users belong to can be reported, a presence suited to a buddy can be displayed.

BRIEF DESCRIPTION OF THE DRAWINGS

FIG. 2A shows an example of information that is managed by a presence server 27 which shows an example of the presence information of a subscriber;

FIG. 2B shows an example of information that is managed by a presence server 27 which shows an example of absolute presence information;

FIG. 2C shows an example of information that is managed by the presence server 27 which shows an example of relative presence information;

FIG. 3A shows an example of information that is managed by a buddy list server 28 which shows an example of a community set;

FIG. 3B shows an example of information that is managed by the buddy list server 28 which shows an example of a non-subscriber buddy list;

BEST MODE FOR CARRYING OUT THE INVENTION

First, the terms used in this specification will be explained.

A 'buddy' is another user that a certain user has registered in a buddy list. By obtaining a buddy's consent, a user is able to acquire presence information of the buddy and display the buddy's state.

A 'buddy list' is a list of registered buddies. A buddy list may be constituted as one list that includes all the buddies. The buddies may be classified as 'friends', 'family', 'company', 'school', and so forth, and there may be a plurality of 'community sets' that are lists of the buddies in the respective groups. In the embodiment described hereinbelow, a case where a buddy list comprises a plurality of community sets will be described.

An 'owner' is a user who creates and edits a buddy list and watches the presence of buddies.

A 'watcher' is an owner who watches one's own presence. The person indicated is the same as an owner but watcher is a term reflecting the standpoint of a buddy watching the presence.

A 'watcher list' is a list that displays a list of watchers watching one's own presence.

'Presence' is the current state of a user. Presence is set by the user himself. In the system of the present invention, a frequently used presence such as 'arrived at work', 'in a meeting', 'moving', 'resting', 'eating', 'driving', 'sleeping', 'private business', 'does not own a mobile phone', 'unable to connect' is specified in advance as a 'fixed presence' and owners are able to set presences (variable presence) in addition to these presences.

The user is able to report the state (presence) of a current caller to friends and acquaintances (watchers) and so forth that have registered the user (caller, presentity) himself as a buddy. Thereupon, the presence set by the caller may be reported as is to a watcher or the presence reported to the watcher may be changed in accordance with the community set to which the watcher belongs. In this case, the presence set by the caller is known as an 'absolute presence' and the presence reported to the watcher in accordance with the community set is known as a 'relative presence'. A 'relative presence' is an apparent presence that can be established in a number corresponding to the number of community sets for one absolute presence. What an owner actually sees is a buddy relative presence.

Figure 1:
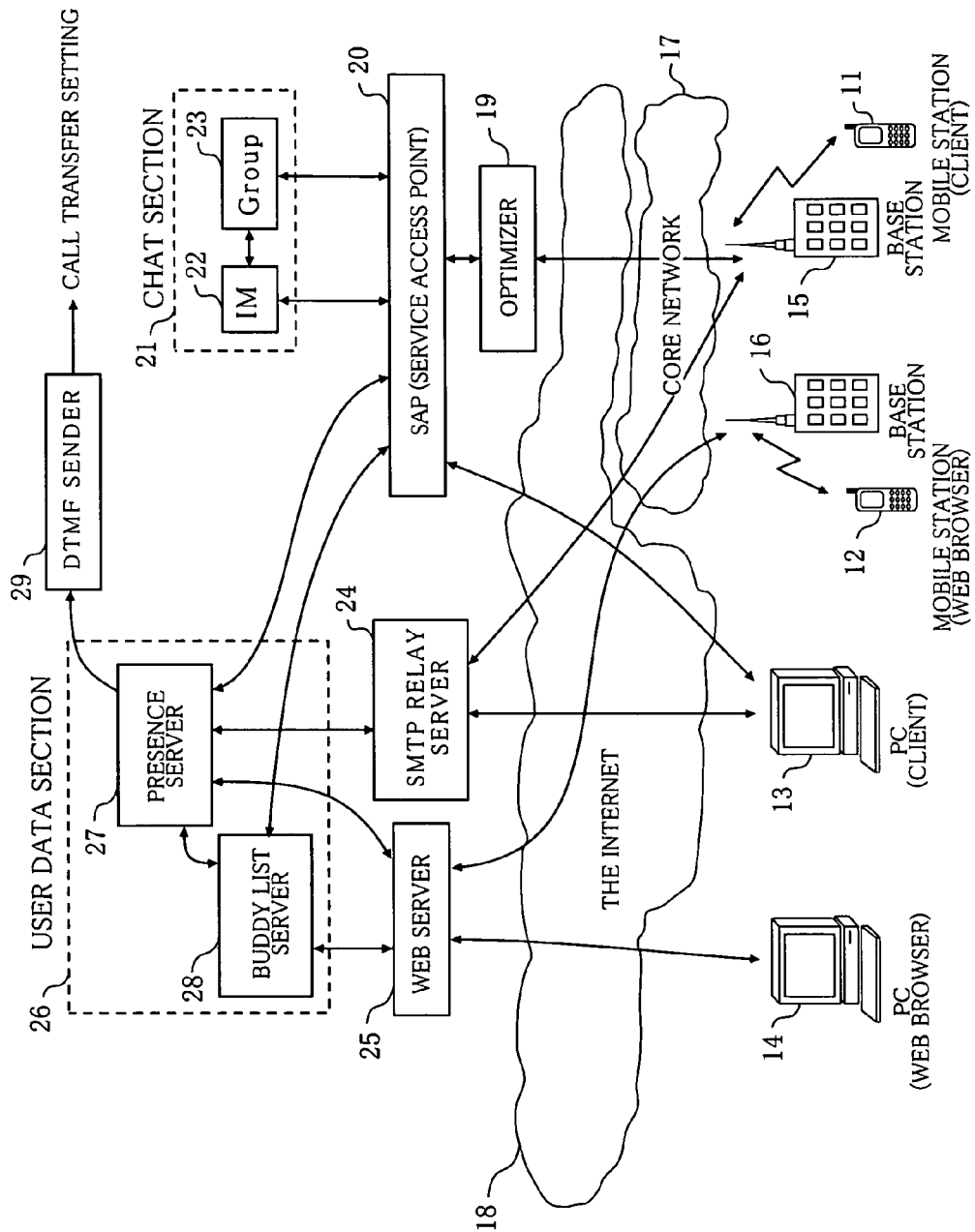
FIG. 1 is a block diagram showing the overall constitution of an embodiment of the presence display system constructed by the present invention.

FIG. 1 shows the overall constitution of an embodiment of a presence display system that is constructed by the server apparatus and client apparatus of the present invention.

In FIG. 1, 11 is a mobile station on which a client program of the presence display system of the present invention runs; 12 is a mobile station in which the client program is not installed; 13 is a personal computer (PC) on which the client program runs; and 14 is a PC on which the client program is not installed. The client program in mobile station 11 is implemented by a Java™ application, for example. Further, as will be described subsequently, the mobile station 12 on which the client program is not installed and the PC14 on which the client program is not installed are able to execute a portion of the functions of the presence display system of the present invention by using a web browser to connect to the server apparatus (user data section 26) of the present invention. Further, the mobile station 11 and PC 13 on which the client program runs are collectively known as the 'client apparatus', the mobile station 11 is known as the 'client', PC13 is known as the 'PC client', the mobile station 12 is known as the 'mobile station (web browser)', and PC14 is known as the 'PC (web browser)'.

15 and 16 are base stations of the mobile communication system, 17 is the core network of the mobile communication system, and 18 is an IP network such as the Internet. As illustrated, the mobile stations 11 and 12 are connected to the Internet 18 via the base stations 15 and 16 and the core network 17. Further, PC13 and PC14 are connected to the Internet 18.

Here, the mobile station 11 is constituted to be able to acquire location information (a rough location information is sufficient.) on its own position. As commonly known, information on the latitude, longitude and place name (address) of the base station is reported in a CBS (Cell Broadcasting Service), this information may be acquired as location information. Or, in the case of a mobile station containing a GPS (Global Positioning System) function, the output may be acquired.

19 is an optimizer that is inserted between the mobile station 11, which is connected via the core network 17 and the Internet 18, and the service access point (SAP) 20. The optimizer 19 performs mutual conversion of a protocol that is adjusted to minimize mobile station communications by using data compression and so forth, and the protocol handled by the SAP20. The SAP20 is a node that plays the role of an interface between a server and client or between a server and another server that are specified by the Wireless Village initiative.

Chat section 21 is a node for providing chat services between mobile stations or between a PC and a mobile station. As shown in FIG. 1, the chat section 21 comprises an IM section 22 that provides IM services and a group section 23 that provides a chat room.

24 is an SMTP (simple mail transfer protocol) relay server for performing mail transfers and provides the function for using mail of the presence display system of the present invention. As will be described subsequently, mail is used in reporting permission to provide presence information during buddy consent or in reporting an invitation to chat.

25 is a web server that has a function to connect the mobile station 12 and PC14 and so forth to a user data section 26, which is a server apparatus.

26 is a user data section that has a function for managing subscriber information, presence information, and buddy lists, and so forth and for providing information if required. The user data section 26 corresponds to the server apparatus of the present invention and comprises two function sections, the presence server 27 for managing subscriber information and presence information and so forth for each subscriber that receives services (presence services) provided by the presence display system of the present invention, and the buddy list server 28 that manages the buddy list and so forth of each subscriber. Further, although the two function sections, the presence server 27 and buddy list server 28, are described as being constituted separately here, these two function sections may be constituted as a single device.

29 is a DTMF (Dual Tone Multi-Frequency) sender for changing the transfer destination telephone number automatically in correspondence with the presence information that is managed by the presence server 27.

As will be described subsequently, the client apparatus (mobile station 11 and PC13) accesses the user data section 26 at regular intervals to acquire buddy presence information and display presences. This will be called 'standby poling' hereinbelow. Further, here, the client apparatus (mobile station 11) notifies the presence server 27 of the location information and updates the location information in the user presence information.

FIGS. 2A to 2C show examples of information that are managed by the presence server 27. FIG. 2A is an example of presence information that is stored by the respective subscribing users, FIG. 2B is information relating to the absolute presence of the respective users, and FIG. 2C is information relating to the relative presence of the respective users.

As shown in FIG. 2A, presence information records subsequent information for each user.

A 'subscriber ID' is an ID (identifier) that is allocated uniquely to all users subscribing to the services. By providing subscriber IDs, the same user can be authenticated even if the mobile station number (MSN) of a subscriber changes.

'UID' is a private identification number of a subscriber mobile station. User authentication is performed by acquiring the UID for access by the mobile station.

'MSN' is the telephone number of a subscriber mobile station. The user is made to input the MSN as ID during login from a PC.

A 'password' is a login password for logging into the service.

A 'PIN' is the personal identification number of the subscriber mobile station.

An 'email address' is the email address of the subscriber mobile station.

'Real name' is text data indicating the name of the subscribing user.

'Nickname' is text indicating the nickname of the subscribing user. The nickname is used as the user's name in a chat or the like or as a default buddy name.

'Selected community set' is the ID of the community set that is currently selected as the target for viewing presence. Further, in this embodiment, up to four community sets can be registered and the selected community sets have the values 0 to 3.

'Standby poling reception' is a flag showing whether standby poling by the mobile station 11 has been delivered and is a flag that shows 'OK' if standby is performed up to a time corresponding with the time set by the 'standby poling interval' (a time that is two times this time, for example) and standby poling by the mobile station 11 is delivered up until that time and which shows 'Fail' if standby poling is not delivered up until that time. As a result, it is possible to know that the mobile station 11 is out of range or the power supply is OFF.

The 'standby poling interval' is information that sets the time interval until the next standby poling by the mobile station 11 in seconds. This information is reported during standby poling by the mobile station 11.

The 'presence update time' is the time at which the previous absolute presence settings are updated.

'Latitude' and 'Longitude' are latitude information and longitude information of the place where the mobile station 11 is currently located (the base station to which the mobile station 11 belongs). This information is reported during standby poling by the mobile station in accordance with the settings of the mobile station.

'Address information' is text information indicating the address of the place where the mobile station 11 is currently located (the address of the base station). This information is reported during standby poling by the mobile station in accordance with the settings of the mobile station.

'Close range threshold value' and 'long range threshold value' are threshold values (in kilometers, for example) that are used to calculate proximity (described subsequently) which is information set by the user and reported to the presence server 27. The sense of distance of each individual user is different depending on the area to which the user belongs and the mode of transport used and so forth and the proximity sensed by each of the users can be established by making it possible for users to set the threshold value optionally.

'Absolute presence setting' is an ID for an absolute presence currently set by the subscribing user.

'Temporary comment' is comment text information that can be used temporarily and that can be described when an absolute presence is selected on the client side.

As mentioned earlier, user set their own absolute presence and the relative presence is reported to their buddies. Therefore, the user registers information relating to their own absolute presence and information relating to their relative presence in advance in the presence server 27.

FIG. 2B shows data specifying the absolute presence.

An 'absolute presence ID' is an ID for uniquely identifying an absolute presence.

An 'absolute presence name' is text indicating the name of the absolute presence.

A 'transfer destination telephone number' is the telephone number of the transfer destination when the presence is selected. This is 'Null' when no telephone number has been input.

A 'no response/no conditions flag' is a flag specifying the timing for transferring a call and carries either of the values 'no response' and 'no conditions'. When 'no response' is set, a transfer is made when there is no response to a call to the mobile station. When 'no conditions' is set, a transfer is made immediately without a call being made to the mobile station.

An 'answering machine flag' is a flag specifying whether to perform a call transfer to an answering machine. This flag has either of the values 'On' and 'Off'. When 'On' is set, an answering machine call transfer is performed and, when 'Off' is set, an answering machine call transfer is not performed.

'Chat permission' is a flag to establish whether chat start requests from other users are permitted when their presence is established. This flag has either of the values 'permitted' and 'not permitted'.

As mentioned earlier, a presence that is reported to a buddy is a relative presence that is established in accordance with the community set to which the buddy belongs. Therefore, a relative presence for each community set of each absolute presence is established with the term 'relative presence for community set'. In this embodiment, the number of community sets is a maximum of four and, therefore, a presence ID for the relative presence corresponding with each of the four community sets (CSet0 to Cset3) is established.

FIG. 2C shows data that specifies the relative presence.

A 'relative presence ID' is the ID of the relative presence.

A 'relative presence name' is text indicating the name of the relative presence. The association between the absolute presence ID and absolute presence name and the association between relative presence ID and relative presence name are always the same.

A 'pictograph code' is a pictograph code for designating a pictograph or icon that is displayed when the relative presence is selected. The client apparatus converts the pictograph code to an icon image file.

A 'relative presence comment' is text information that is displayed when the relative presence is selected.

In the example appearing in FIGS. 2B and 2C, when the absolute presence of the user is 'in a meeting' (ID=1), the relative presence 'in a meeting' (ID=1) is reported to buddies that belong to a first community set (CSet0) ('company', for example) and the relative presence 'arrived at work' (ID=0) is reported to buddies belonging to second and third community sets (CSet1 and CSet2) ('friends' and 'family', for example). That is, because there is no need to go as far as informing the family or friends that the user is in a meeting, simply 'arrived at work' is reported. Thus, a presence display suited to the attributes of each of the buddies can be implemented.

The information that is managed by the buddy list server 28 will be described next. 'Community sets' and 'non-subscriber list', which are buddy lists, are stored in the buddy list server 28. Further, as will be mentioned subsequently, the buddy list server 28 creates a 'watcher list' in accordance with a request from the mobile stations 11 and 12 or PCs 13 and 14 and presents this watcher list to the user.

FIG. 3A shows an example of a 'community set'. As mentioned earlier, the 'community set' is a list in which an owner classifies each of their buddies and stores a variety of information as illustrated.

A 'community set ID' is an ID for identifying a community set. In this embodiment, four community sets can be established, and the community set ID takes the value of 0 to 3.

A 'community set name' is text indicating the name of a community set.

A 'buddy ID' is the ID of each buddy. A buddy can be uniquely specified through association with a subscriber ID of the presence server or a non-subscriber ID of the non-subscriber list.

The 'display order' is information indicating the buddy display order on the client side. Because the display order is transmitted after being determined by client settings, the display order is stored in the buddy list server.

A 'buddy name' is text information indicating a nickname given to the buddy by an owner.

'Proximity' is information that displays the level of the distance between the owner and buddy that is calculated by the buddy list server 28 from the latitude and longitude of the buddy, and the close range threshold value and long range threshold value that are supplied by the presence server 27. In this embodiment, which level of the distance levels of three stages the distance belongs to is displayed by the proximity, which takes any of the values 'close', 'midrange', 'long', and 'N/A'. If the distance between the owner and buddy calculated from the latitude and longitude thereof is less than the close range threshold value, 'close' is displayed. 'Midrange' is displayed when the distance is greater than the close range value and less than the long range threshold value, 'long' is displayed when the distance is equal to or more than the long range threshold value, and 'N/A' is displayed when calculation of the distance between the owner and buddy is not possible for any reason such as non-disclosure of the latitude and longitude of the buddy. Further, the number of stages is not limited to three and can be determined optionally. However, when privacy is considered, there is little detail but about two to five or six stages are established.

'Location information notification permission (location permission)' is information indicating to what extent a buddy permits disclosure of location information by the owner. Any of the values 'full', 'only proximity', 'denied' and 'N/A' may be taken. If 'full' disclosure is granted, text of address information is supplied to the owner. If 'only proximity' disclosure is permitted, only proximity is supplied to the owner. In the case of 'denied', location information is not provided at all. Further, 'N/A' is displayed when consent to provide a buddy presence has not been given or in the case of non-subscription to the services.

A 'buddy consent flag (consent)' is a flag that holds information on whether the buddy is permitted to provide the owner with a presence and takes any of the values 'OK', 'NG', and 'N/A'. If 'OK', the buddy list server 28 requests and receives buddy presence information from the presence server 27. 'NG' indicates a state where the provision of a presence has been denied by the buddy, in which case the buddy list server 28 requests and receives only static information from the presence server 27. 'N/A' indicates a state where the buddy does not subscribe to the service or a state where the granting/non-granting of presence provision has not been reported. The execution of presence provision is the same as 'NG'.

A 'service subscription flag (subscription)' is a flag that holds information on whether the buddy has subscribed to the service and takes either of the values 'OK' and 'NG'.

FIG. 3B shows an example of the 'non-subscriber list'. The 'non-subscriber list' is a list of buddies who were registered in the buddy list by the owner but have not yet subscribed to the service.

As illustrated, the following information is stored in the non-subscriber list.

A 'non-subscriber ID' is the ID of a buddy that is recorded in the non-subscriber list.

A 'non-subscriber buddy name' is text indicating a nickname that is given to a non-subscriber buddy by the owner.

A 'non-subscriber telephone number (MSN)' is the telephone number of a non-subscriber buddy.

A 'non-subscriber email address' is the email address of a non-subscriber buddy.

The exchange of data between the client apparatus (mobile station 11, PC13), the mobile station 12 or the PC14 and the user data section 26 when the respective information shown in FIGS. 2 and 3 is updated will be described next.

Standby Poling

First, 'standby poling' in which the client apparatus (mobile station, PC) 11 and 13 access the user data section 26 at fixed intervals will be described.

Figure 4:
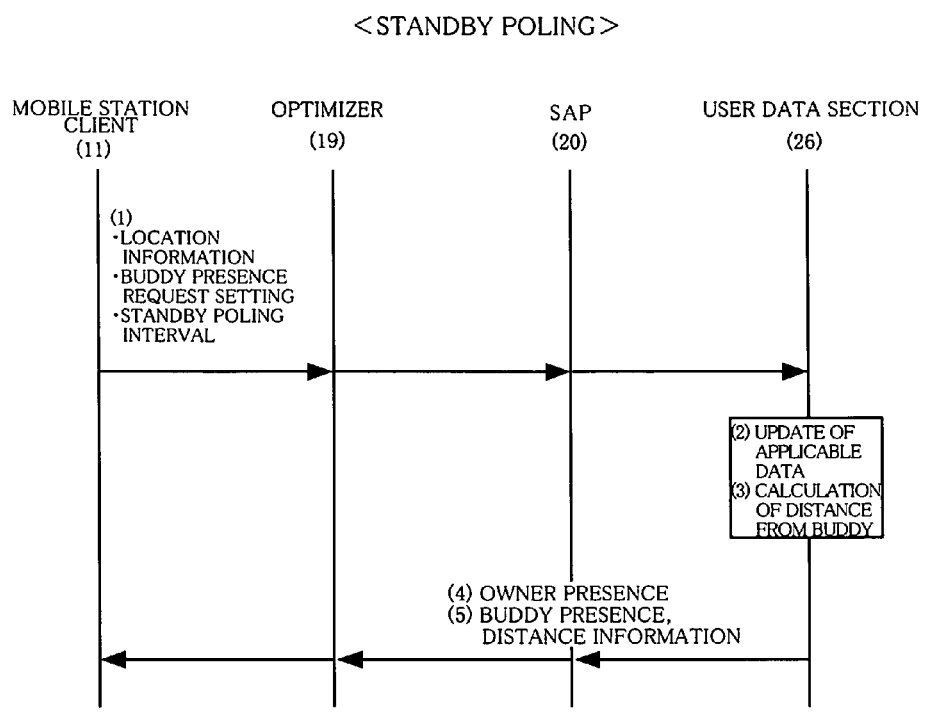
FIG. 4 is a sequence diagram during standby poling.

FIG. 4 is a sequence diagram for when standby poling is performed.

The mobile station (client) 11 knows the time to perform poling from standby poling interval data (in seconds) that is saved in the mobile station 11 and performs poling after standing by for the number of seconds of the standby poling interval after the previous poling.

During poling, the mobile station (client) 11 sends location information (address information, latitude, longitude) and buddy presence request setting information (information indicating a request concerning all members of the buddy list or a request that treats community sets as units) and information on the standby poling interval (seconds) to the optimizer 19 (1). The optimizer 19 decompresses data that has been compressed and transmitted by the mobile station 11 and sends the decompressed data to the SAP20. The SAP20 transmits the received data to the user data section 26.

Further, in the case of the PC (client) 13 rather than the mobile station 11, the optimizer 19 does not exist in the sequence and communicates directly with the SAP20. Further, in the case of PC (client) 13, location information is not sent.

The user data section 26 updates applicable data of the presence information shown in FIG. 2A in accordance with data that have been transmitted by the mobile station 11 via the SAP20 (2), and calculates information relating to the distance between the user and buddy (3).

Further, the user data section 26 transmits the following information, which is to be transmitted to the mobile station 11, to the SAP20. Here, information that is transmitted from the user data section 26 to each client apparatus is (4) information relating to one's own presence (absolute presence setting) and (5) information relating to the presence of a buddy and the distance from the buddy (relative presence name, relative presence pictograph code, relative presence comment or temporary comment, proximity, and so forth).

The SAP20 transmits the information that has been sent from the user data section 26 to the optimizer 19, whereupon the optimizer 19 compresses the data thus sent and transmits the compressed data to the mobile station (client) 11.

The mobile station (client) 11 performs processing to decompress the compressed data thus received and display the buddy presence.

Further, this processing will be described in detail hereinafter.

Thus, respective information (dynamic information) such as location information (address information (place name information), latitude, longitude), buddy presence request settings, and the standby poling interval are transmitted during standby poling, while information of a low update frequency that need not be acquired each time by poling (also called 'static information' hereinbelow) can be updated at any time by the mobile stations 11 and 12 or PCs 13 and 14.

Static information includes absolute presence-related setting information (the respective information of the transfer destination telephone number, 'no response/no conditions flag', 'answering machine flag', 'chat permission', and relative presence setting for community set n), relative presence-related setting information (the respective information of a relative presence pictograph code and relative presence comment), and respective setting information for email addresses, nicknames, the close range threshold value, the long-range threshold value, the selection of community sets, community set names, display order, and so forth.

Updating of Static Information

Figure 5A:
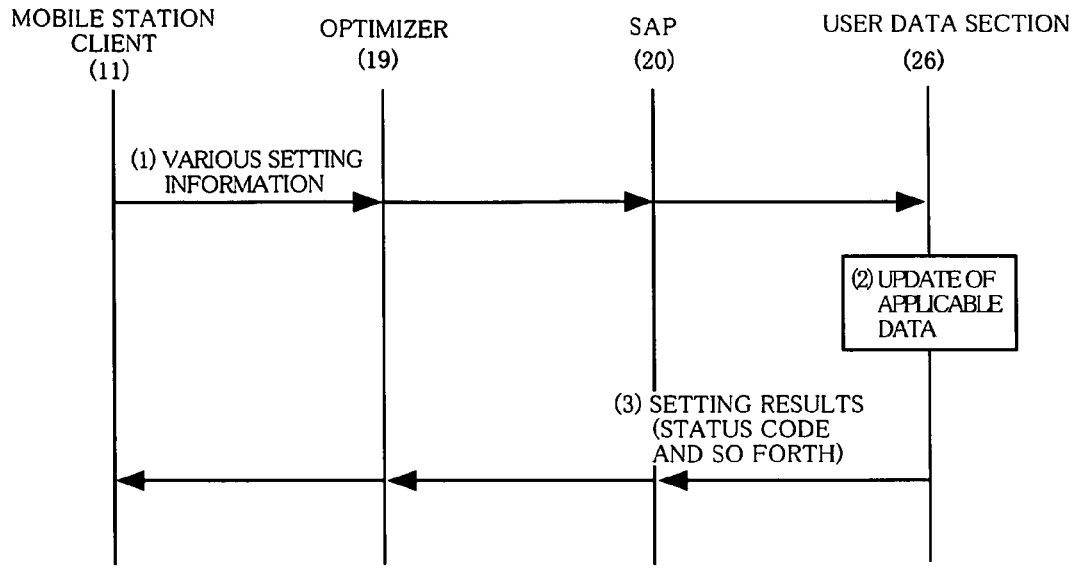
FIG. 5A is a sequence diagram during an update of static information which is a sequence diagram for when an update is made from a mobile station (client)
Figure 5B:
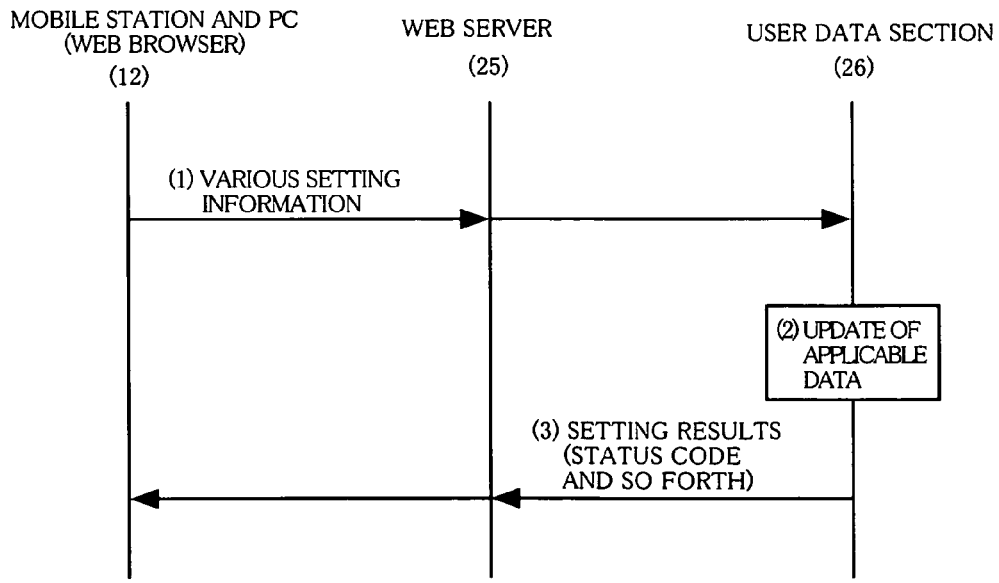
FIG. 5B is a sequence diagram during an update of static information which is a sequence diagram for when an update is made from a mobile station or PC (browser)

FIGS. 5A and 5B are sequence diagrams for when the static information above is updated. FIG. 5A represents a case when an update is made by a mobile station (client) and FIG. 5B represents a case when an update is made by a mobile station or PC (web browser).

When static information is updated by the mobile station (client) 11, as shown in FIG. 5A, the mobile station (client) 11 transmits the various setting information (1) to the user data section 26 via the optimizer 19 and the SAP20. The user data section 26 updates the applicable data (2) and sends back the results to the mobile station (client) 11 via the opposite route to the aforementioned route (3).

Further, when various setting information is updated by the mobile station 12 or PC14 on which the client program is not installed, the mobile station 12 or PC14 uses a web browser program to transmit various setting information to the user data section 26 via the web server 25 (1). Accordingly, the user data section 26 updates the applicable data (2) and transmits the setting result to the mobile station 12 or PC14 via the web server 25, as per the case of FIG. 5A (3).

Thus, the updating and setting of the static information can also be performed by the mobile station 12 or PC14 on which the client program is not installed.

As a result, even in the event of complex settings, the settings can be made easily by the PC14 or the like.

Furthermore, the registration of buddies, the updating of buddy names, the movement of community sets to which buddies belong, and the deletion of buddies can be performed at any time by the mobile station 11 or 12.

The registration of buddies in the buddy list is performed by setting the 'mobile station number (MSN)', 'nickname', 'mail address', and so forth. Here, information required for registration is acquired from an address book that is stored by the owner. Thus, the presence display system of the present invention is made to cooperate with the address book stored in the mobile station.

Buddy Registration

Figure 6:
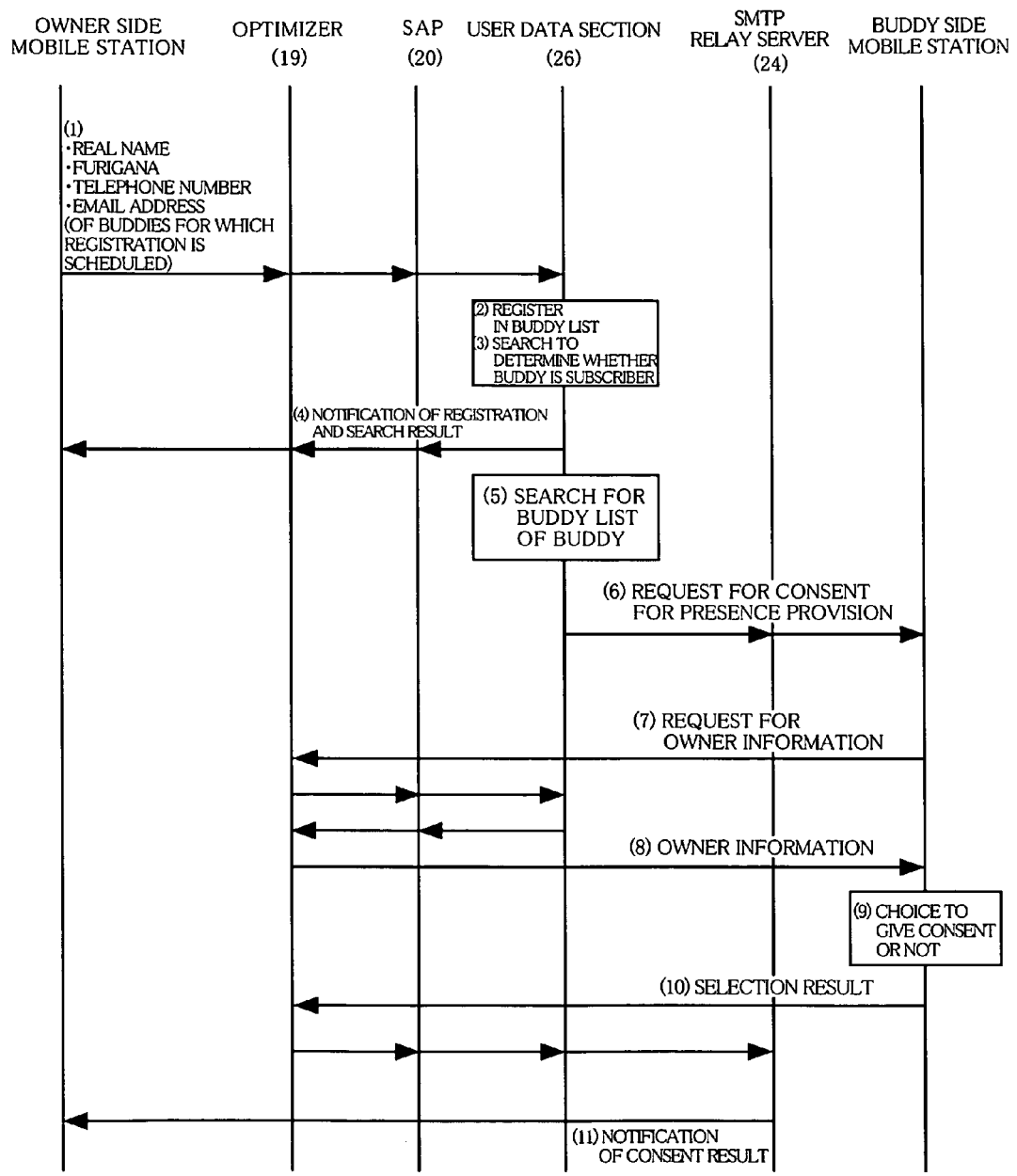
FIG. 6 is a sequence diagram for when a buddy is registered.

FIG. 6 is a sequence diagram for when buddies are registered.

When the owner is going to register a buddy in the buddy list, the owner selects a partner (buddy) who is thought to want their presence watched from the address book stored in the mobile station. As a result, information such as the real name, furigana, mobile station number (MSN), email address, and nickname of the selected buddy as well as the community set to which the selected buddy belongs is read from the address book and transmitted to the user data section 26 via the optimizer 19 and SAP20 (1).

The user data section 26 registers information on the buddy in the buddy list on the basis of the transmitted information (2) and performs a search to determine whether the buddy is a subscriber to the presence service (3). This is performed by comparing the mobile station number of the buddy with the MSNs of the service subscribers contained in the presence information stored in the presence server 27.

Further, the user data section 26 notifies the owner's mobile station of the search results (4). When the buddy has not subscribed to the presence service of the present invention, this fact is relayed to the owner's mobile station. Further, the user data section 26 makes the field of the 'service subscriber flag' of the buddy of the buddy list (community set) (FIG. 3A) 'NG' and the field of the 'buddy consent flag' 'N/A', adds the non-subscriber ID, and records the name (nickname), MSN, and email address in the non-subscriber list (FIG. 3B).

On the other hand, when the buddy is a subscriber to the presence service, the user data section 26 informs the owner's mobile station of the fact that the buddy is a subscriber and a consent request is being transmitted to the buddy. Thereafter, the user data section 26 performs a search to determine whether the owner, who registered the buddy in the buddy list, has been registered as a buddy (5).

Further, the user data section 26 sends an email requesting consent for presence provision to the buddy's mobile station via an SMTP relay server (6). A URL is contained in the mailing requesting consent for presence provision and, by accessing this URL, the real name, furigana, telephone number, and email address of the owner can be obtained.

The URL contained in the consent request is accessed by the client program or web browser of the mobile station of the buddy that received the email requesting consent for presence provision (7), information relating to the owner (real name, furigana, telephone number, email address) is acquired from the user data section 26 (8), whereupon the screen for consent of the presence is displayed on the screen of the buddy's mobile station.

The buddy chooses whether or not to provide the owner with presence via the presence consent screen (9). There are three different options for the buddy, namely, 'provide', 'do not provide', 'provide and also register partner'. However, when the owner is already registered in the buddy list of the buddy, 'provide and also register partner' cannot be selected.

The selected result (10) is reported to the user data section 26 and reported by mail to the owner via an SMTP relay server 24 (11). When the response is 'provide' or 'provide and also register partner', the item 'buddy consent flag' of the buddy in the owner's buddy list is set to 'OK' and, when the response is 'do not provide', the 'buddy consent flag' is set to 'NG'. Further, when the response is 'provide and also register', the positions of the owner and buddy are switched and the above sequence is executed sequentially.

Thus, information such as the community set and non-subscriber list shown in FIG. 3 is created.

Changing of Absolute Presence Settings

The changing of the absolute presence settings can be performed by the mobile station 11 or 12.

Figure 7:
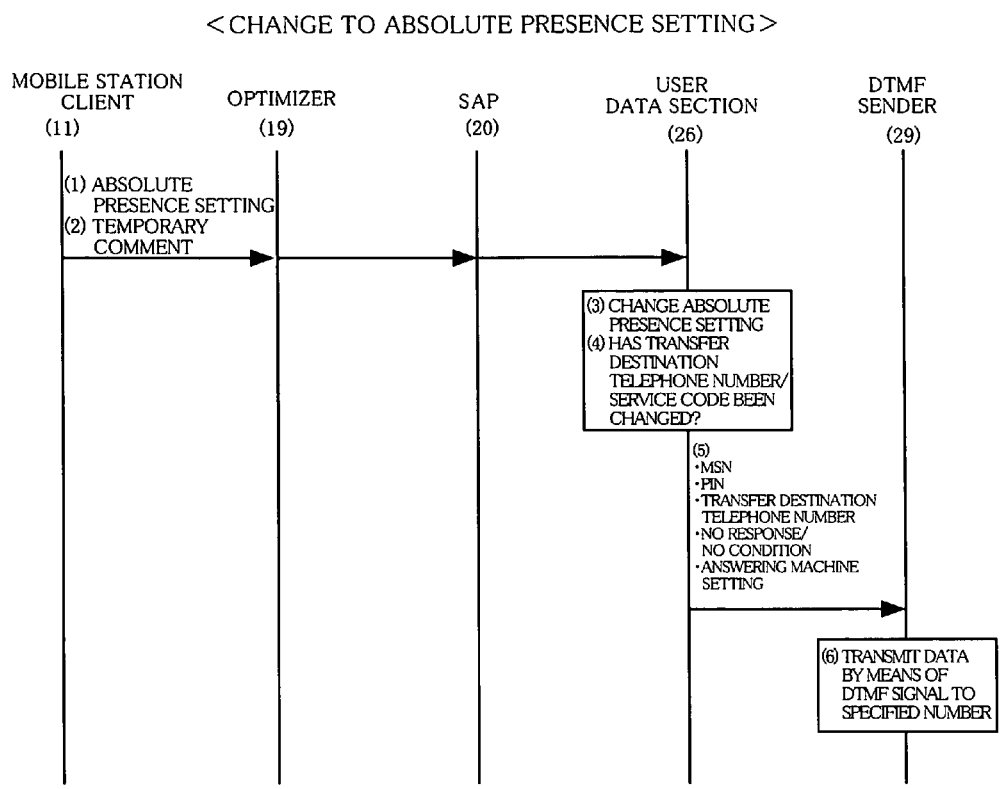
FIG. 7 is a sequence diagram for when an absolute presence is changed.

FIG. 7 is a sequence diagram for when the absolute presence is changed.

When the absolute presence is changed, the user of the mobile station (client) 11 operates the mobile station (client) 11, changes the absolute presence setting, that is, transmits the ID of the changed absolute presence to the optimizer 19 (1). At the same time, when the temporary comment is input, the temporary comment is also transmitted to the optimizer 19 (2). The optimizer 19 decompresses data that has been compressed and transmitted by the mobile station 11 and transmits the data to the SAP20. The SAP20 transmits the data thus sent to the user data section 26. The presence server 27 of the user data section 26 updates the absolute presence setting in the presence information shown in FIG. 2A with the ID of the absolute presence thus sent (3). Further, the presence server 27 references the absolute presence information (FIG. 2B), judges whether there have been any changes to service codes for the transfer destination telephone number, no response/no conditions, answering machine setting, and so forth (4) and, when there has been a change, information such as the MSN, personal identification number, transfer destination telephone number, no response/no conditions, and answering machine setting and so forth (5) is transmitted to the DTMF sender 29. The DTMF sender 29 transmits data applicable to a specified telephone number that is specified in advance (5) by means of a DTMF signal. As a result, changes to the telephone number of the transfer destination and so forth can be reflected.

Further, by accessing the user data section 26 via a web server 25, the mobile station (web browser) 12 is able to change the absolute presence setting.

Watcher List

As mentioned earlier, the buddy list server 28 has a function to create and send back a 'watcher list' that shows a list of owners watching one's own presence in accordance with a request from the client apparatus, mobile station 12 and PC14. The user (presentity) is able to use this function to deny each of the individual watchers presence provision and to change the setting of the 'location information permission notification'.

Figure 8A:
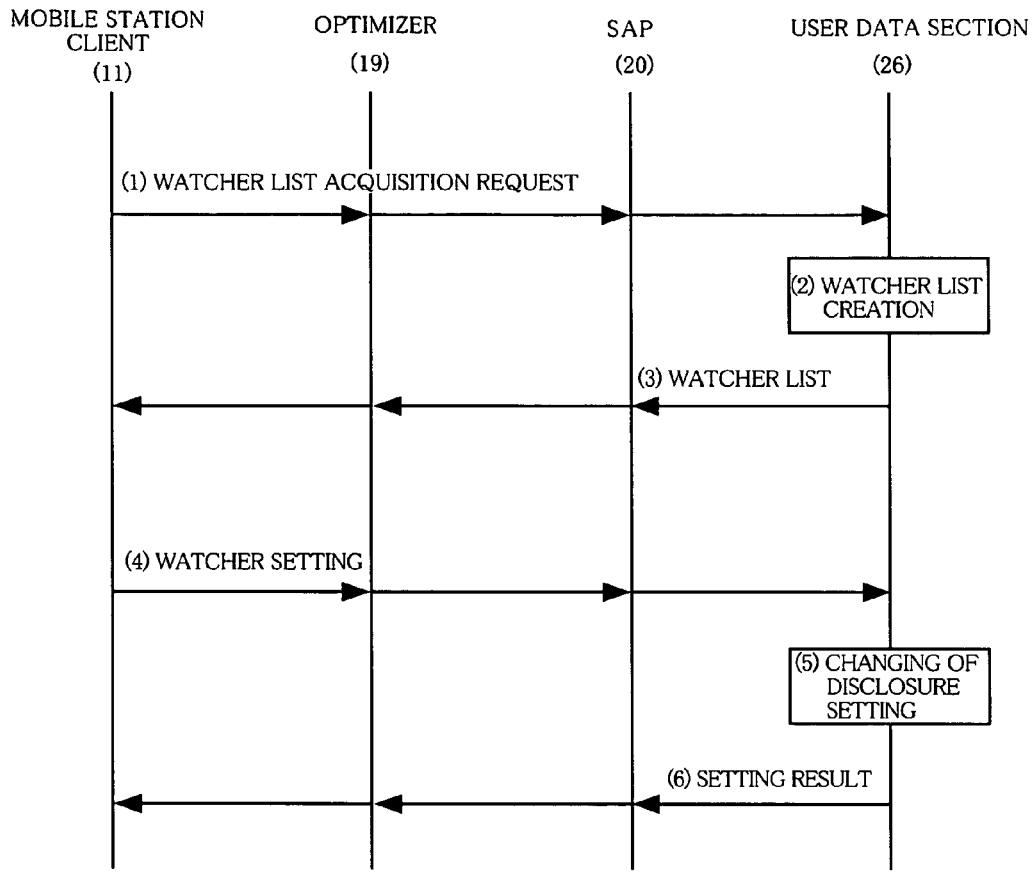
FIG. 8A is a diagram serving to illustrate a watcher list which is a sequence diagram for when the watcher list is acquired.

FIG. 8A is a sequence diagram for when there has been a request to acquire a watcher list from the mobile station (client) 11.

The user data section 26 that received the watcher list acquisition request (1) from the mobile station 11 via the optimizer 19 and SAP20 searches for a buddy list (information on the community set in FIG. 3A) and creates a list of the users (watchers) that have registered the user of the mobile station 11 as a buddy (2). The created watcher list is then transmitted to the mobile station 11 via a route that is the reverse of the aforementioned route (3).

Figure 8B:
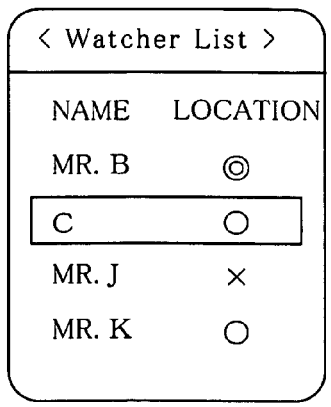
FIG. 8B is a diagram serving to illustrate a watcher list which shows a screen for displaying a watcher list.

FIG. 8B shows an aspect in which a watcher list is displayed on the screen of the mobile station 11. As shown in FIG. 8B, the watcher list displays the names (nicknames) of the users (watchers) that have registered the user as a buddy, as well as the content of the location information notification permission that has been set for each watcher by the user.

The user of the mobile station 11 is able to use the watcher list display screen to change the disclosure setting, that is, change the content of the location information notification permission setting for each watcher and is able to cancel the provision of presence information for each watcher.

Figure 8C:
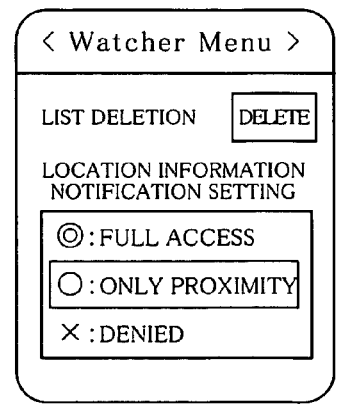
FIG. 8C is a diagram serving to illustrate a watcher list which shows a screen for updating the watcher public settings.

That is, when the user selects a watcher whose disclosure setting would be changed in FIG. 8B, the display screen for changing the disclosure setting of the watcher shown in FIG. 8C is displayed. Therefore, when the provision of presence information for the watcher is cancelled, the user selects 'delete', which is displayed. Further, when the location information notification setting is changed, the user selects any of the 'full access', 'only proximity', and 'denied'.

As shown in FIG. 8A, the watcher setting information (4) that changes the disclosure setting of the watcher is transmitted to the user data section 26 via the optimizer 19 and SAP20. The user data section 26 rewrites the part corresponding with the information of the buddy list of the corresponding watcher (information of the community set shown in FIG. 3A) on the basis of the information received (5). The user data section 26 then returns the setting results (status code and so forth) to the mobile station 11 via a route that is the opposite to the aforementioned route (6).

Further, although FIG. 8A shows the sequence when a watcher list acquisition request is produced by the mobile station (client) 11, the watcher list can likewise be acquired by the PC (client) 13. In addition, a request for the watcher list can also be sent to the user data section 26 via the web server 25 by the mobile station (web browser) 12 and PC (web browser) 14 on which the client program is not installed, whereby the disclosure setting of the watcher can be changed.

Thus, the user acquires a list of the watchers watching the user's own presence and, in a state where the watcher list is displayed, the user is able to perform an operation to change the presence disclosure settings for the watchers and change the location information notification permission setting.

Details of the Processing During Standby Poling

The processing of the mobile station (client) 11 and user data section 26 during standby poling that was described using FIG. 4 will be described in detail next with reference to FIGS. 9 to 11.

Figure 9:
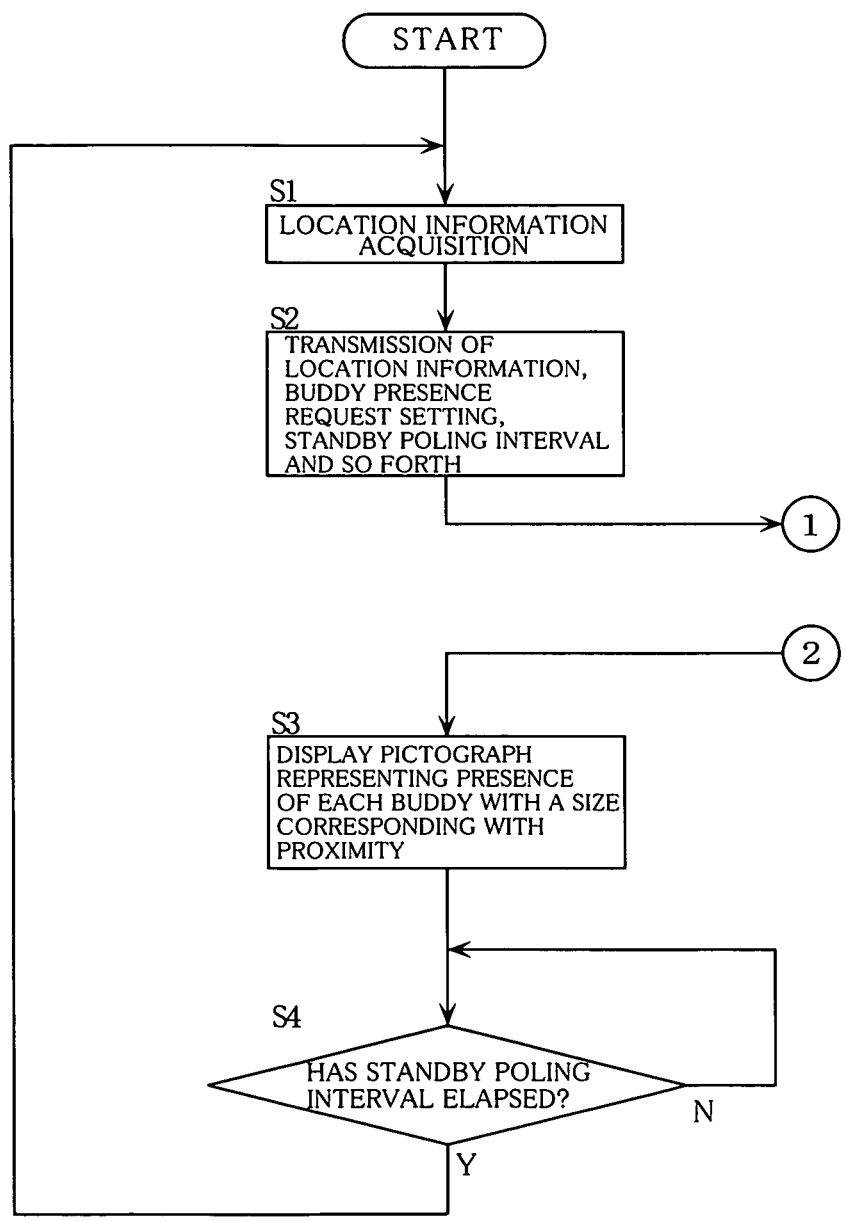
FIG. 9 is a flowchart for the processing of the mobile station (client) 11 during standby poling.

FIG. 9 is a flowchart showing the flow of processing of the mobile station 11. FIG. 10 is a flowchart showing the flow of the processing of the user data section (server) 26 upon receipt of signals transmitted at fixed intervals by the mobile station 11. FIG. 11 is a flowchart showing the flow of proximity calculation processing that is executed by the buddy list server 28.

As shown in FIG. 9, the mobile station 11, which is the client, first acquires the location information (step S1). As mentioned earlier, the mobile station 11 may acquire latitude, longitude and address information reported by the base station or, in the case of a mobile station that contains a GPS function, may use the output of the GPS function.

Thereafter, the mobile station 11 transmits information such as location information that is acquired in step S1, buddy presence request setting information indicating the buddies whose presence the owner of the mobile station would like to acquire, and standby poling interval information indicating the time interval until the next standby poling to the user data section 26 (step S2).

Figure 10:
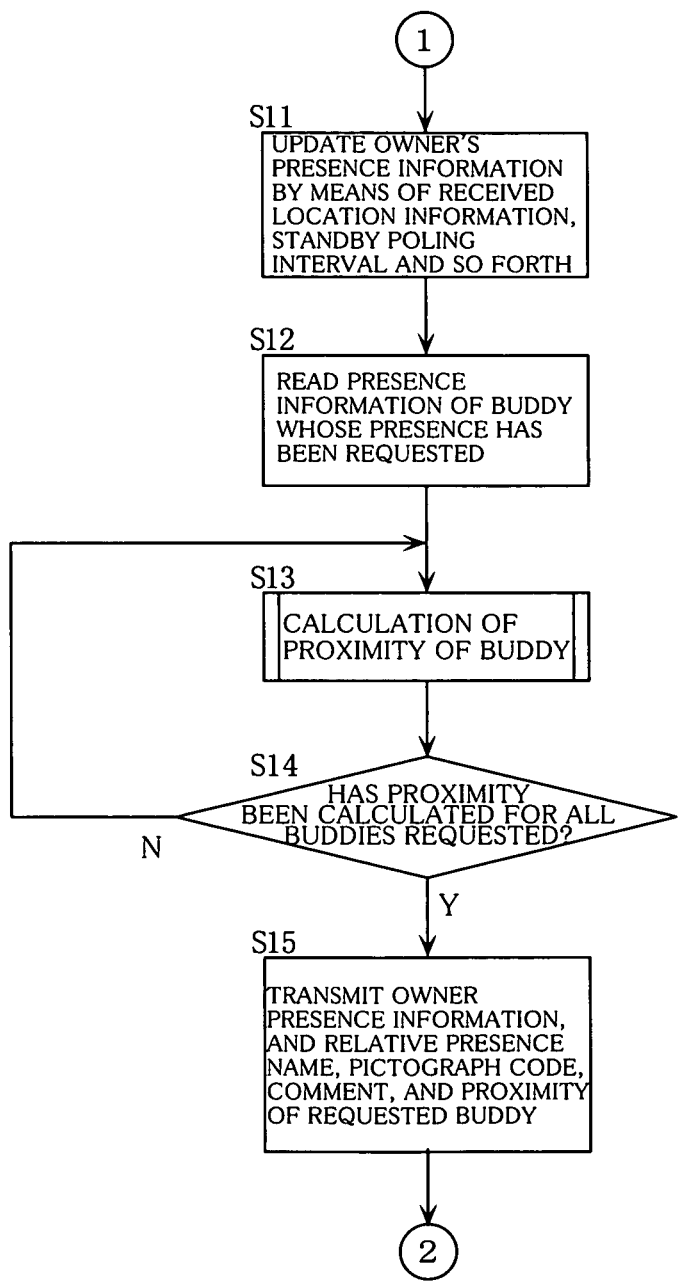
FIG. 10 is a flowchart for the processing of a user data section during standby poling.

FIG. 10 is a flowchart of the processing that is executed by the user data section 26 upon receipt of standby poling information transmitted by the mobile station 11 in step S2.

The presence server 27 of the user data section 26 that has received information transmitted at fixed intervals by the standby poling first updates the presence information (FIG. 2A) of the owner of the mobile station by means of information such as the location information and standby poling interval and so forth thus received (step S11).

Thereafter, the presence server 27 specifies the buddies that belong to the community set whose presence has been requested on the basis of the received buddy presence request setting information and reads the presence information of the buddies (step S12).

Further, the presence server 27 sequentially calculates the proximity of each buddy (steps S13 and S14).

Figure 11:
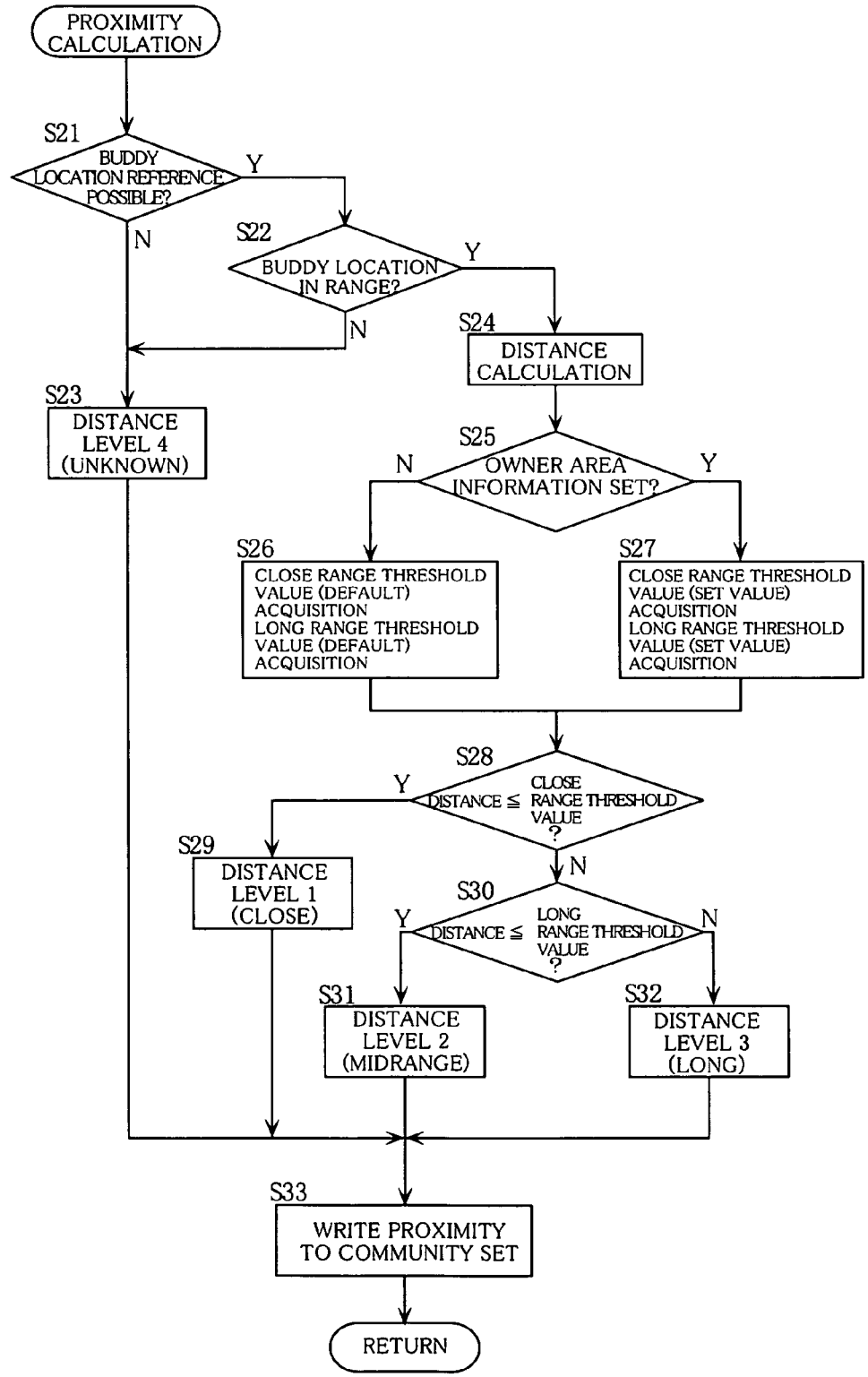
FIG. 11 is a flowchart for proximity calculation processing.

FIG. 11 is a flowchart showing the details of the proximity calculation processing (S13). This processing is executed by the buddy list server 28.

First, the community set information is referenced and it is judged whether the targeted buddy allows location information to be acquired (step S21). When the location permission information of the buddy is N/A, it is impossible to reference the buddy position. The processing therefore progresses to step S23 in which it is assumed that the buddy distance level (proximity) is level 4 unknown (N/A).

Further, when the location permission information is full or only proximity, the processing moves to step S22 and it is judged whether the buddy is in range. This can be judged by whether information regarding standby poling reception in the buddy presence information is Fail. That is, as mentioned earlier, the standby poling reception flag is set to Fail when standby poling information has not been received even when a time that is, for example, two times the time set as the standby poling interval has elapsed and, by referencing the standby poling reception flag, it can be judged that the buddy is out of range. Alternatively, information on whether the buddy is out of range may be acquired from information from the mobile communication system.

In step S22, when it is judged that the buddy is not in range, the processing moves to step S23 in which it is assumed that the distance level is distance level 4 that indicates unknown (N/A).

When it is judged that the buddy is in range in step S22, the processing moves to step S24 and the distance between the buddy and the owner is calculated. That is, the distance between the buddy and the owner is calculated on the basis of latitude and longitude information that is contained in the presence information of the buddy and latitude and longitude information that is contained in the presence information of the owner.

Thereafter, the processing moves to step S25, whereupon it is judged whether close range threshold value information and long range threshold value information has been set in the owner presence information. When such information has not been set, a close range threshold value and long range threshold value that were set beforehand (default values) are acquired (step S26). Further, when a close range threshold value and long range threshold value have been set in the presence information, these information are acquired (step S27).

Further, it is judged whether the distance between the buddy and the owner is close, midrange, or long by comparing the distance calculated in step S24 with the close range threshold value and long range threshold value acquired in step S26 or step S27 (steps S28 to S32). That is, it is judged that the distance level is distance level 1 (close) when the calculated distance_close range threshold value, that the distance level is distance level 2 (midrange) when the close range threshold value<the calculated distance_long range threshold value, and that the distance level is distance level 3 (long) when the long distance threshold value<the calculated distance.

Thus, because the default values have been set, the default values can be used as is even in the case of a user that does not set or change the threshold values.

The judgment result is then written as the proximity item of the community set information (step S33).

Returning now to FIG. 10, after executing such proximity calculation processing for all the buddies whose presence has been requested (step S14), the user data section 26 transmits the information required to display the presences of the requested buddies to the mobile station 11 (step S15). That is, information, such as the buddy names, the display order and proximity, the relative presence names for the community set of the buddies, the pictograph codes, and comments (where they exist) which are contained in the community set information of the community set whose presence was requested, is transmitted to the mobile station 11.

Returning now to FIG. 9, the mobile station 11, which has received the information transmitted by the user data section 26 in step S15, displays image data corresponding to the pictograph that corresponds with the presence of each buddy in a size suited to the proximity.

The mobile station 11 then stands by until the time of the set standby poling interval has elapsed (step S4) and re-executes the processing of step S1 and subsequent steps when the time of the standby poling interval has elapsed.

Figure 12A:
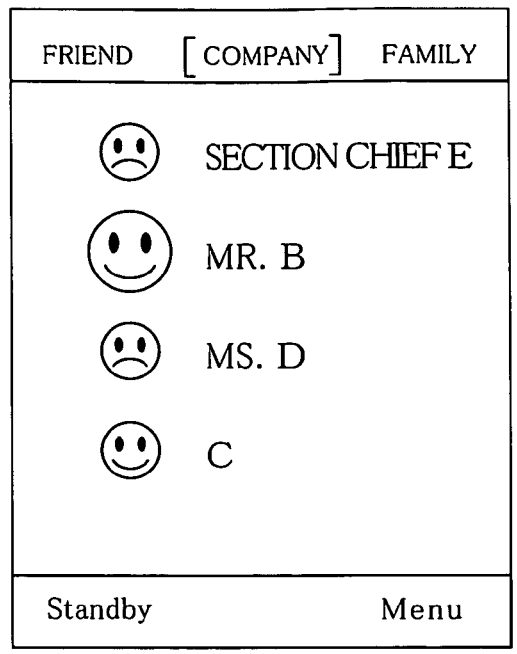
FIG. 12A is a diagram showing a state where the presence of buddies is displayed which shows an example of a screen for displaying a buddy list.

FIG. 12A shows an aspect in which the buddy list is displayed on the screen of the mobile station. In the illustrated example, there is a buddy list for each of the community sets that are classified as 'friends', 'company', and 'family' and an aspect where buddies belonging to the 'company' community set is displayed is shown.

In the illustrated example, an area where the presence is displayed as an icon and an area where the name (nickname) is displayed are established for each buddy. Here, because 'section chief E' is a non-subscriber and the consent of 'Ms. D' is NG (FIG. 3A), corresponding icons are displayed. Further, it can be seen that the icon for 'Mr. B' is a larger icon than the icon of 'C', and the distance (proximity) to 'Mr. B' is 'close' and the distance to 'C' is midrange. Further, when the distance is 'long', a smaller icon than the icon displayed for 'C' is displayed.

Here, when a buddy is out of range, the fact that the buddy is out of range may be displayed by displaying '?' in the area in front of the icon and by thinly displaying the name of the buddy. Further, FIG. 12A shows a state where the presences of 'Mr. B' and 'C' are the same and the same icon is displayed. However, icons that correspond with each presence are displayed. For example, when the buddy is moving, an icon showing a mode of transport such as a train is used.

Figure 12B:
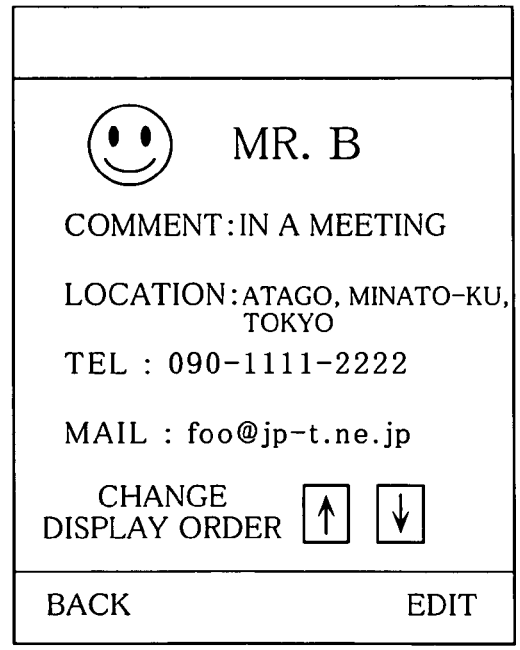
FIG. 12B is a diagram showing a state where a buddy presence is displayed which shows an example of a screen for displaying a detailed presence of a selected buddy.

Furthermore, when presences are displayed as per FIG. 12A, the detailed presence of a selected buddy can be displayed. FIG. 12B shows an aspect in which buddy 'Mr. B' in FIG. 12A is selected and the detailed presence thereof is displayed.

As illustrated in FIG. 12B, the buddy's comments, telephone number, and mail address are displayed. Further, it can be seen that the location permission of buddy 'Mr. B' is full access (FIG. 3A) and, therefore, the address of buddy 'Mr. B' is also displayed. Further, when 'only proximity' is set, the address field is shown blank. In addition, a button for changing the display order of the buddies is displayed and, by operating this button, setting information for changing the display order of the buddies can be transmitted to the buddy list server 28.

Further, depending on the frequency with which the location information is changing, a state of movement can be represented by using the presence display of a moving image. For example, the distance moved can be calculated from the difference from the previously acquired location information and transmitted to the mobile station and an animation display suited to the distance moved (movement speed) may be executed by the mobile station.

Furthermore, by calculating the relative speed of movement from the buddy (fluctuations in the distance), an animation showing a close aspect and an animation showing a far-off aspect can also be used.

In addition, by adding a compass or map, or the like to the client apparatus, the positional relationship with the partner can be expressed including the direction.

Furthermore, a strong or weak sound or vibrations can be provided in accordance with the proximity (distance level) to the buddy selected in advance.

In addition, proximity corresponding to age can be displayed by establishing a threshold value corresponding to the buddy's age.

Further, although proximity was calculated on the server side in above description, location information of the buddy can be transmitted from the server to the mobile station (client) and a calculation of proximity may be performed on the client side and the proximity displayed by means of an icon of the corresponding size (graphical data).

Moreover, although, in the standby poling executed at predetermined time intervals, location information is reported and buddy presence information is received in the above embodiment, the present invention is not limited to or by such an arrangement. The notification of location information and the receipt of presence information may also be performed individually. For example, the location information may be transmitted from the client apparatus to the server apparatus at predetermined time intervals and the buddy presence information may be transmitted from the server apparatus to the client apparatus at time intervals determined independently of the notification of location information.

The invention claimed is:

1. A server apparatus in a presence display system comprising the server apparatus and a client apparatus for each user, constituted to allow the client apparatus to display the states of other users, comprising:
   means for holding information indicating the states of each user and location information that are transmitted by each of the client apparatuses;

means for storing a buddy list that registers first other users, being buddies of the user, whose states a user wishes to watch;

means for transmitting, to the user, information indicating the states of the first other users registered in the buddy list of the user and information relating to the distance between the user and the first other users registered in the buddy list of the user; and means for creating a watcher list of second other users, being watchers of the user, that are watching the state of the user, wherein the watcher list is created independently of the buddy list of the user but is created from the watchers of the user that have each registered the user as a buddy on respective buddy lists of each corresponding watcher; and means for transmitting the watcher list to the user in accordance with a request from the user, wherein, based on the watcher list received by the user, the user is able to perform an operation to change presence disclosure settings for the watchers of the user, and wherein, based on the buddy list of the user, the user is able to acquire presence information of the buddies of the user.

2. The server apparatus in a presence display system according to claim 1, wherein the location information includes latitude and longitude information, and the apparatus further comprises:

means for calculating the distance between the user and the first other users registered in the buddy list on the basis of the latitude and longitude information transmitted by each user, and determining the proximity of the first other users by comparing the calculated distance with a predetermined threshold value, and wherein the proximity thus determined is transmitted to the client apparatus as information relating to the distance between the user and the first other users.

3. The server apparatus in a presence display system according to claim 2, wherein the threshold value can be optionally set by each user.

4. The server apparatus in a presence display system according to claim 2, wherein the location information further includes address information, and address information is transmitted to the client apparatus in addition to the proximity.

5. The server apparatus in a presence display system according to claim 4, wherein means for storing information indicating whether a user gives consent for address information thereon to be transmitted to the second other users, and the address information is not transmitted to the client apparatus of users that have not consented to the transmission of address information.

6. The server apparatus in a presence display system according to claim 1, wherein means for storing information indicating whether a user gives consent for information relating to the distance thereof to be transmitted to the second other users, and the information relating to the distance is not transmitted to the client apparatus of users that have not consented to the transmission of information relating to distance.

7. The server apparatus in a presence display system according to claim 1, wherein the buddy list is constituted by a plurality of community sets in which the first other users whose state the user wishes to watch are registered in groups; and information indicating the states of the first other users registered in a community set designated by the user and information relating to the distances between the user and the first other users are transmitted to the client apparatus.

8. The server apparatus in a presence display system according to claim 7, wherein a relative presence setting table, which associates and stores information indicating the state of the user and information indicating states transmitted to the second other users in accordance with the community sets to which the second other users that have registered the user in a buddy list belong, is provided for each user; and when information indicating the states of each user is transmitted to the second other users that are watching the state of the user, information indicating states corresponding with the community sets of the second other users is transmitted by referencing the relative presence setting table.

9. The server apparatus in a presence display system according to claim 8, wherein the relative presence setting table causes different relative presence information to be displayed for different community sets of the second other users.

10. The server apparatus in a presence display system according to claim 1, further comprising:

means for receiving location information from each of the client apparatuses.

11. The server apparatus in a presence display system according to claim 1, further comprising:

means for transmitting location information to each of the client apparatuses.

12. The server apparatus in a presence display system according to claim 1, further comprising:

means for transmitting a state of movement of each user to each of the client apparatuses.

13. The server apparatus in a presence display system according to claim 1, further comprising:

means for determining location information using a base station id associated with each of the client apparatuses.

14. The server apparatus in a presence display system according to claim 1, wherein information relating to distance between the user and the first other users includes location information of the first other users that is transmitted to the user and used by the user to calculate the distance.

15. A client apparatus in a presence display system comprising a server apparatus and a client apparatus for each user, constituted to allow the client apparatus to display the states of other users, comprising:

means for transmitting information indicating the state of a user and location information to the server apparatus;

means for receiving information of a buddy list of the user indicating the states of first other users, being buddies of the user, and information relating to the distance between the user and the first other users from the server apparatus;

means for displaying the states of the first other users in a display form that corresponds with the distance between the first other users and the user on the basis of the information indicating the states of the first other users and information relating to the distance between the user and the first other users thus received; and means for receiving a watcher list of second other users, being watchers of the user, that are watching the state of the user in accordance with a request therefor, wherein the watcher list is created independently of the buddy list of the user but is created from the watchers of the user that have each registered the user as a buddy on respective buddy lists of each corresponding watcher, wherein, based on the watcher list received by the user, the user is able to perform an operation to change presence disclosure settings for the watchers of the user, and wherein, based on the buddy list of the user, the user is able to acquire presence information of the buddies of the user.

16. The client apparatus in a presence display system according to claim 15, wherein
the information relating to the distance between the user and the first other users is the proximity that is determined by comparing the distance between the user and the first other users with a predetermined threshold value; and
the displaying means displays an image corresponding with the information indicating the states of the first other users received from the server apparatus with a size that corresponds with the proximity.

17. The client apparatus in a presence display system according to claim 15, wherein
the information relating to the distance between the user and the first other users further includes address information, and
the displaying means is capable of displaying the addresses of the first other users.

18. The client apparatus in a presence display system according to claim 15, further comprising:
means for transmitting location information to the server.

19. The client apparatus in a presence display system according to claim 15, further comprising:
means for receiving location information from the server.

20. The client apparatus in a presence display system according to claim 15, further comprising:
means for receiving a state of movement of each user from the server.

21. The client apparatus in a presence display system according to claim 15, further comprising:
means for determining location information using a base station id associated with the client apparatus.

22. The client apparatus in a presence display system according to claim 15, wherein a relative presence setting table, which associates and stores information indicating the state of each user and information indicating states transmitted to the second other users in accordance with the community sets to which the second other users that have registered the user in a buddy list belong, is provided for each user; and when information indicating the states of each user is transmitted to second other users that are watching the state of the user, information indicating states corresponding with the community sets of the second other users is transmitted by referencing the relative presence setting table, wherein the relative presence setting table causes different relative presence information to be displayed for different community sets of the second other users.

23. The client apparatus in a presence display system according to claim 15, wherein information relating to distance between the user and the first other users includes location information of the other users that is transmitted to the client apparatus and used by the client apparatus to calculate the distance.

24. A method of allowing client apparatuses in a presence display system to display states of users, comprising:
holding information indicating the states of each user;
storing a buddy list of a user that registers first other users, being buddies of the user, whose states the user wishes to watch;
transmitting, to the user, information indicating the states of the first other users registered in the buddy list of the user and information relating to the distance between the user and the first other users registered in the buddy list of the user;
creating a watcher list of second other users, being watchers of the user, that are watching the state of the user wherein the watcher list is created independently of the buddy list of the user but is created from the watchers of the user that have each registered the user as a buddy on respective buddy lists of each corresponding watcher; and
transmitting the watcher list to the user in accordance with a request from the user, wherein, based on the watcher list received by the user, the user is able to perform an operation to change presence disclosure settings for the watchers of the user, and wherein, based on the buddy list of the user, the user is able to acquire presence information of the buddies of the user.

25. The method according to claim 24, wherein the buddy list is constituted by a plurality of community sets in which the first other users whose state the user wishes to watch are registered in groups, and wherein information indicating the states of the first other users registered in a community set designated by the user are transmitted to the client apparatus.

26. The method according to claim 25, wherein a relative presence setting table, which associates and stores information indicating the state of the user and information indicating states transmitted to the second other users in accordance with the community sets to which the second other users that have registered the user in a buddy list belong, is provided for the user, and wherein when information indicating the state of the user is transmitted to the second other users that are watching the state of the user, information indicating states corresponding with the community sets of the second other users is transmitted by referencing the relative presence setting table.

27. The server apparatus in a presence display system according to claim 26, wherein the relative presence setting table causes different relative presence information to be displayed for different community sets of the second other users.

28. The method according to claim 24, further comprising:
holding information indicating location information for each user, wherein the location information includes latitude and longitude information;
transmitting, to the user, information relating to the distance between the user and the first other users in the buddy list that is calculated on the basis of the latitude and longitude information of each user; and
determining proximity of the first other users by comparing the distance with a predetermined threshold value, wherein the proximity is transmitted as information relating to the distance between the user and the first other users.

29. The method according to claim 28, wherein the threshold value can be optionally set by each user.

30. The method according to claim 28, wherein location information is transmitted by each of the client apparatuses.

31. The method according to claim 28, wherein location information is provided from the server to each client apparatus of the users.

32. The method according to claim 28, further comprising:
transmitting a state of movement of each user to each of the client apparatuses.

33. The method according to claim 28, further comprising:
determining location information using a base station id associated with each of the client apparatuses.

34. The method according to claim 28, wherein information indicating whether a user gives consent for information relating to the distance thereof to be transmitted to the second other users is provided for each user, and the information relating to the distance is not transmitted to the client apparatus of users that have not consented to the transmission of information relating to distance.

35. The method according to claim 28, wherein the location information further includes address information, and address information is transmitted to the client apparatus in addition to the proximity.

36. The method according to claim 35, wherein information indicating whether a user gives consent for address information thereon to be transmitted to the second other users is provided for each user, and wherein the address information is not transmitted to the client apparatus of users that have not consented to the transmission of address information.

37. The method according to claim 24, further comprising:
transmitting, to the user, location information for at least one of the first other users in the buddy list.

38. The method according to claim 37, further comprising:
the user determining proximity of the first other users in the buddy list by calculating a distance between the user and the first other users using the location information.

39. The method according to claim 38, further comprising:
comparing the distance with a predetermined threshold value.

40. The method according to claim 37, wherein the location information includes latitude and longitude information.

41. The method according to claim 37, wherein transmitting location information and transmitting information indicating the states of the first other users are performed independently.

42. The method according to claim 37, wherein the location information is the proximity of the first other users to the user.

43. A server apparatus, comprising:
a user data section containing information indicating the states of each user and containing a buddy list that registers, for a user, first other users, being buddies of the user, whose states the user wishes to watch;
a first transmission section, coupled to the user data section to transmit, to the user, information indicating the states of the first other users registered in the buddy list of the user, and information relating to the distance between the user and the first other users registered in the buddy list of the user;
a watcher list creation section that creates a watcher list of second other users, being watchers of the user, that are watching the state of the user, wherein the watcher list is created independently of the buddy list of the user but is created from the watchers of the user that have each registered the user as a buddy on respective buddy lists of each corresponding watcher; and
a second transmission section that transmits the watcher list to the user in accordance with a request from the user, wherein, based on the watcher list received by the user, the user is able to perform an operation to change presence disclosure settings for the watchers of the user, and wherein, based on the buddy list of the user, the user is able to acquire presence information of the buddies of the user.

44. The server apparatus according to claim 43, wherein location information is provided to at least one of the first other users that are registered in the buddy list.

45. The server apparatus according to claim 44, wherein the user determines proximity of the first other users in the buddy list by calculating a distance between the user and the at least one of the first other users using the location information.

46. The server apparatus according to claim 45, wherein the distance is compared with a predetermined threshold value.

47. The server apparatus according to claim 44, wherein the location information includes latitude and longitude information.

48. The server apparatus according to claim 44, wherein providing location information and providing information indicating the states of the first other users are performed independently.

49. The server apparatus according to claim 44, wherein the location information is the proximity of the first other users to the user.

* * * * *